United States Patent
Kim et al.

(10) Patent No.: US 10,447,715 B2
(45) Date of Patent: Oct. 15, 2019

(54) APPARATUS AND METHOD OF DETECTING DISTRIBUTED REFLECTION DENIAL OF SERVICE ATTACK BASED ON FLOW INFORMATION

(71) Applicant: ELECTRONICS AND TELECOMMUNICATIONS RESEARCH INSTITUTE, Daejeon (KR)

(72) Inventors: Jung Tae Kim, Daejeon (KR); Koo Hong Kang, Daejeon (KR); Ik Kyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 431 days.

(21) Appl. No.: 15/251,134

(22) Filed: Aug. 30, 2016

(65) Prior Publication Data

US 2017/0257386 A1    Sep. 7, 2017

(30) Foreign Application Priority Data

Mar. 2, 2016 (KR) ........................ 10-2016-0025182

(51) Int. Cl.
*H04L 29/06* (2006.01)

(52) U.S. Cl.
CPC ...... *H04L 63/1425* (2013.01); *H04L 63/1458* (2013.01)

(58) Field of Classification Search
CPC .................................................. H04L 63/1425
USPC .............................................................. 726/23
See application file for complete search history.

(56) References Cited

U.S. PATENT DOCUMENTS

| | | | | |
|---|---|---|---|---|
| 2002/0051448 | A1* | 5/2002 | Kalkunte | H04L 49/30 370/389 |
| 2003/0167314 | A1* | 9/2003 | Gilbert | H04L 29/06 709/217 |
| 2011/0197274 | A1* | 8/2011 | Callon | H04L 47/10 726/22 |

(Continued)

FOREIGN PATENT DOCUMENTS

| KR | 10-2006-0005719 A | 1/2006 |
|---|---|---|
| KR | 10-1420301 B1 | 7/2014 |
| KR | 10-2015-0088047 A | 7/2015 |

OTHER PUBLICATIONS

Hyunjung Na et al., "Distributed Denial of Service Attack Detection using Netflow Traffic", The 20th Autumn Conference Thesis Collection of Korea Information Processing Society Association, Nov. 2003, pp. 1957-1960, vol. 10, Issue 2.

*Primary Examiner* — Kambiz Zand
*Assistant Examiner* — Thanh H Le

(57) ABSTRACT

Disclosed is an apparatus of detecting a distributed reflection denial of service attack, including: a monitoring unit obtaining flow information including an IP and a port number of a source, an IP and a port number of a destination of data, and the number and the sizes of packets; a memory unit storing a flow table in which the flow information of the data, the packet number and the packet size are input; and a control unit detecting the DRDoS attack by using at least one of the number and the size of packets of the first entry and the flow information of the first entry.

19 Claims, 9 Drawing Sheets

(56) References Cited

U.S. PATENT DOCUMENTS

2015/0150133 A1 5/2015 Han et al.
2015/0256555 A1 9/2015 Choi et al.

* cited by examiner

APPARATUS AND METHOD OF DETECTING DISTRIBUTED REFLECTION DENIAL OF SERVICE ATTACK BASED ON FLOW INFORMATION

CROSS-REFERENCE TO RELATED APPLICATIONS

This application claims priority to and the benefit of Korean Patent Application No. 10-2016-0025182 filed in the Korean Intellectual Property Office on Mar. 2, 2016, the entire contents of which are incorporated herein by reference.

TECHNICAL FIELD

The present invention relates to an apparatus and a method of detecting information on an attack source, an attack target, and the like with respect to a distributed reflection denial of service (DRDoS) attack based on network flow data.

BACKGROUND ART

Distributed reflection denial of service (hereinafter, referred to as DRDoS) is an attack type evolved from DDoS by one step. As the DRDoS, a Smurf attack is representative, which knocks down an attack target by transmitting numerous echo reply packets to the attack target by sending an ICMP echo request packet to which an IP address is spoofed to a broadcast address.

The DRDoS attack uses as an agent of the DRDoS attack a system that operates a normal service by using vulnerability of a network communication protocol structure without installing a separate agent.

Therefore, it is known that it is easy for hackers to use the DRDoS attack and it is also difficult to recover an attacked site. The DRDos attack has shown primarily abroad in recent years and the maximum DDoS attack traffic which had ever been announced was also an attack which occurs by the DRDoS.

The DRDoS attack uses a structural characteristic of DNS, NTP, SNMP, CHARGEN service, and the like using a UDP protocol and is generally divided into reflection and amplification attack patterns.

An attacker sends a large quantity of request messages to a server using a vulnerable service by falsifying a source IP to an attack target IP and the server attempts to reflect response messages to the requests to the attack target IP. In this case, the reflected response message is amplified by mass traffic to be transferred to the attack target.

The attacker may attack the attack target by using a server which is opened to the outside as a stop without using a zombie PC, and the like in order to make the mass traffic and the mass traffic flows into a victim from not the attacker but the server to cause service denial.

For example, a MON_GETLIST command is performed, which modulates the IP, requests ANY and TXT to the DNS server or requests IP addresses of 6000 hosts which communicate with the corresponding NTP server in recent years to the NTP server.

Traffic monitoring for the server which may be used as the DRDoS attack stop is required for detecting such an attack symptom and an apparatus and a method which can detect information on the stop, an attack source, and the like used in the DRDoS attack from monitored flow data are required to be developed.

SUMMARY OF THE INVENTION

The present invention has been made in an effort to provide to a user an apparatus and a method which can detect various types of DRDoS attacks by using flow information and track information on stops, sources, and the like used in the attacks.

Meanwhile, the technical objects of the present invention are not limited to the aforementioned technical objects, and other technical objects, which are not mentioned above, will be apparently appreciated by a person having ordinary skill in the art from the following description.

An exemplary embodiment of the present invention provides an apparatus of detecting a distributed reflection denial of service attack, including: a monitoring unit obtaining flow information including an IP of a source, a port number of the source, an IP of a destination, and a port number of the destination of data which flows at one point of a communication network, and the number and the sizes of packets; a memory unit storing a flow table in which the flow information of the data, the packet number and the packet size are input; and a control unit inputting the number and the sizes of packets of data obtained by the monitoring unit for a predetermined time as a first entry for each flow information in the flow table when at least one of the port number of the source and the port number of the destination of the data is a predetermined port number and detecting the DRDoS attack by using at least one of the number of packets and the size of packet of the first entry and the flow information of the first entry.

The control unit may determine a host having a destination IP item value of the first entry as a victim of the DRDoS attack when a source port number item value of the first entry is the predetermined port number, a packet number item value of the first entry is larger than a predetermined first value or a size item value of the first entry is larger than a predetermined second value.

The control unit may determine the source IP item value of the first entry as an IP which an attacker of the DRDoS attack spoofs when the destination port number item value of the first entry is the predetermined port number and the packet number item value of the first entry is larger than a predetermined third value.

The control unit may determine a host having the destination IP item value as the victim of the DRDoS attack when the source port number item value of the first entry is the predetermined port number, the destination IP item value among the first entries input in the flow table is the same, and the number of first entries in which the source port number item value is the same is larger than a predetermined fourth value.

The control unit may determine the destination IP item value as the IP which the attacker of the DRDoS attacks spoofs when the destination port number item value of the first entry is the predetermined port number, the source IP item value among the first entries input in the flow table is the same, and the number of first entries in which the destination port number item value is the same is larger than a predetermined fifth value.

The control unit may newly generate the flow table every predetermined time to input the number and the sizes of packets of the data obtained by the monitoring unit for a predetermined time in the flow table generated as the first entry for each flow information, generate F1, F2, F3, F4, and F5 items in the first entry, grant 1 to the F1 value of the first entry when the source port number item value of the first entry is the predetermined port number and the packet number item value of the first entry is a predetermined sixth value, grant 1 to the F2 value of the first entry when the source port number item value of the first entry is the predetermined port number and the packet size item value of the first entry is a predetermined seventh value, grant 1 to the F3 value of the first entry when the destination port number item value of the first entry is the predetermined port number and the packet number item value of the first entry is larger than a predetermined eighth value, calculate the number of first entries in which the destination IP item value is the same and the source port number item value is the same among the first entries input into the flow table and grant 1 to the F4 value of the first entry in which the destination IP item value is the same and the source port number item value is the same when the calculated number of first entries is larger than a predetermined 9-th value, calculate the number of first entries in which the source IP item value is the same and the destination port number item value is the same among the first entries input into the flow table and grant 1 to the F5 value of the first entry in which the source IP item value is the same and the destination port number item value is the same when the calculated number of first entries is larger than a predetermined 10-th value, generate an Acc flow table in the storage unit, input F1 to F5 of the first entry of the flow table in the Acc flow table as the second entry for each flow information and aggregate and input the F1 to F5 values of the second entry having the same flow information, and determine that the DRDoS attack occurs when at least one of F1 to F5 of the second entry in the Acc flow table is larger than a predetermined 11-th value whenever all of the first entries of the respective generated flow tables every predetermined time are to be input.

The control unit may generate an Aging item in the second entry, and whenever all of the first entries of the respective flow tables generated every predetermined time are input, increase the Aging value of the second entry in which at least one value of F1 to F5 values increases among the second entries by 1, decrease the Aging value of the second entry in which the F1 to F5 values are maintained among the second entries by 1, and delete the second entry in which the Aging value is 0 from the Acc flow table.

The flow information may include information indicating whether the data is a query packet and whether the data is a response packet, and the control unit may determine that the DRDoS attack occurs when the source IP and the port number of the query packet are the same as the destination IP and the port number of the response packet and the destination IP and the port number of the query packet are the same as the source IP and the port number of the response packet, and a difference between the number of query packets and the number of response packets is larger than a predetermined 12-th value for the predetermined time.

The flow information may include information indicating whether the data is a query packet and whether the data is a response packet, and the control unit may determine that the DRDoS attack occurs when the source IP and the port number of the query packet are not the same as the destination IP and the port number of the response packet or the destination IP and the port number of the query packet are not the same as the source IP and the port number of the response packet.

The monitoring unit and the control unit may be provided in plural, and the plurality of respective control units may transmit and receive the stored flow table to and from each other and detect the DRDoS attack by further using the received flow table.

Another exemplary embodiment of the present invention provides a method of detecting a distributed reflection denial of service attack, including: obtaining flow information including an IP of a source, a port number of the source, an IP of a destination, and a port number of the destination of data which flows at one point of a communication network, and the number and the sizes of packets; inputting the number and the sizes of packets of data obtained for a predetermined time as a first entry for each flow information in the flow table when at least one of a port number of a source and the port number of a destination of the data is a predetermined port number; and detecting the DRDoS attack by using at least one of the number of packets and the size of packet of the first entry and the flow information of the first entry.

In the detecting of the DRDoS attack, a host having a destination IP item value of the first entry may be determined as a victim of the DRDoS attack when a source port number item value of the first entry is the predetermined port number, a packet number item value of the first entry is larger than a predetermined first value or a size item value of the first entry is larger than a predetermined second value.

In the detecting of the DRDoS attack, the source IP item value of the first entry may be determined as an IP which an attacker of the DRDoS attack spoofs when the destination port number item value of the first entry is the predetermined port number and the packet number item value of the first entry is larger than a predetermined third value.

In the detecting of the DRDoS attack, a host having the destination IP item value may be determined as the victim of the DRDoS attack when the source port number item value of the first entry is the predetermined port number, the destination IP item value among the first entries input in the flow table is the same, and the number of first entries in which the source port number item value is the same is larger than a predetermined fourth value.

In the detecting of the DRDoS attack, a host having the destination IP item value may be determined as the IP which the attacker of the DRDoS attacks spoofs when the destination port number item value of the first entry is the predetermined port number, the source IP item value among the first entries input in the flow table is the same, and the number of first entries in which the destination port number item value is the same is larger than a predetermined fifth value.

The method may further include: newly generating the flow table every predetermined time to input the number and the sizes of packets of the data obtained by the monitoring unit for a predetermined time in the flow table generated as the first entry for each flow information; generating F1, F2, F3, F4, and F5 items in the first entry and granting 1 to the F1 value of the first entry when the source port number item value of the first entry is the predetermined port number and the packet number item value of the first entry is larger than a predetermined 6-th value, granting 1 to the F2 value of the first entry when the source port number item value of the first entry is the predetermined port number and the packet size item value of the first entry is larger than a predetermined 7-th value, granting 1 to the F3 value of the first entry when the destination port number item value of the first entry is the predetermined port number and the packet number item value of the first entry is larger than a predetermined 8-th value, calculating the number of first entries in which the destination IP item value is the same and the source port number item value is the same among the first entries input in the flow table and granting 1 to the F4 value of the first entry in which the destination IP item value is the same and the source port number item value is the same when the calculated number of first entries is larger than a predetermined 9-th value, and calculating the number of first entries in which the source IP item value is the same and the destination port number item value is the same among the first entries input in the flow table and granting 1 to the F5 value of the first entry in which the source IP item value is the same and the destination port number item value is the same when the calculated number of first entries is larger than a predetermined 10-th value; generating an Acc flow table; inputting F1 to F5 of the first entry of the flow table in the Acc flow table as the second entry for each flow information and aggregating and inputting the F1 to F5 values of the second entry having the same flow information; and determining that the DRDoS attack occurs when at least one of F1 to F5 of the second entry in the Acc flow table is larger than a predetermined 11-th value whenever all of the first entries of the respective generated flow tables every predetermined time are to be input.

The generating of the Aging item in the second entry may further include increasing the Aging value of the second entry in which at least one value of the F1 to F5 values increases among the second entries by 1 and decreasing the Aging value of the second entry in which the F1 to F5 values are maintained among the second entries by 1 whenever all of the first entries of the respective generated flow tables every predetermined time are to be input, and deleting the second entry in which the Aging value is 0 from the Acc flow table.

The flow information may include information indicating whether the data is a query packet and whether the data is a response packet, and in the detecting of the DRDoS attack, it may be determined that the DRDoS attack occurs when the source IP and the port number of the query packet are the same as the destination IP and the port number of the response packet and the destination IP and the port number of the query packet are the same as the source IP and the port number of the response packet, and a difference between the number of query packets and the number of response packets is larger than a predetermined 12-th value for the predetermined time.

The flow information may include information indicating whether the data is a query packet and whether the data is a response packet, and in the detecting of the DRDoS attack, it may be determined that the DRDoS attack occurs when the source IP and the port number of the query packet are not the same as the destination IP and the port number of the response packet or the destination IP and the port number of the query packet are not the same as the source IP and the port number of the response packet.

According to exemplary embodiments of the present invention, it is possible to provide an apparatus and a method which can detect DRDoS attacks by using flow information and track information on stops, sources, and the like used in the attacks. Meanwhile, effects which can be obtained in the present invention are not limited to the aforementioned effects and other unmentioned effects will be clearly understood by those skilled in the art from the following description.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

BRIEF DESCRIPTION OF THE DRAWINGS

The accompanying drawings of this specification exemplify a preferred exemplary embodiment of the present invention, the spirit of the present invention will be more clearly understood from the following detailed description taken in conjunction with the accompanying drawings, and thus it will be understood that the present invention is not limited to only contents illustrated in the accompanying drawings.

Further.

Figure 1:
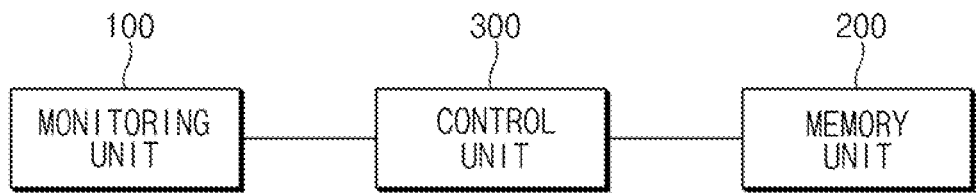
FIG. 1 is a block diagram of an apparatus of detecting a distributed reflection denial of service attack according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the exemplary drawings. When reference numerals refer to components of each drawing, it is noted that although the same components are illustrated in different drawings, the same components are designated by the same reference numerals as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a component from another component, but nature or an order of the component is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

FIG. 1 is a block diagram of an apparatus of detecting a distributed reflection denial of service attack according to an exemplary embodiment of the present invention. Referring to FIG. 1, the apparatus of detecting a distributed reflection denial of service attack may include a monitoring unit, a control unit, and a memory unit.

However, since components illustrated in FIG. 1 are not required, an apparatus of detecting a distributed reflection denial of service attack, which has more components there than or less components there than may be implemented.

First, the monitoring unit is a component that obtains flow information of data which flows at one point of a communication network, and the number and sizes of packets.

The monitoring unit may be network equipment such as a router, a switch, and the like in an actual communication network and the monitoring unit may be installed at a point for detecting the DRDoS attack.

However, the flow information obtained by the monitoring unit may include information on an IP of a source, a port number of the source, an IP of a destination, a port number of the destination, whether data is a query packet and whether the data is a response packet.

The memory unit is a component that stores a flow table in which the flow information, the packet number and the packet size, and the like are input. The flow table may be updated by input by the control unit and the same type of flow table may be newly generated every predetermined time.

In the exemplary embodiment of the present invention, the flow table may be generated in a form shown in Table 1 given below.

TABLE 1

| Source IP | Destination IP | Source port number | Destination port number | Packet number | Size |
|---|---|---|---|---|---|
| 1.1.1.1 | 2.2.2.2 | 1111 | 2222 | 11 | 222 |

However, the form of the flow table is not limited thereto.

In the flow table, a horizontal row is one entry and each entry may be expressed as the packet number and size of the data obtained by the monitoring unit for each flow information.

The flow table having the form shown in Table 1 is newly generated every predetermined time by the control unit, and as a result, the entry may be input for the predetermined time. In the present specification, the entry that represents the packet number and size of the data for each flow information is referred to as a first entry.

In addition, the flow table may be generated in a form shown in Table 2 given below.

TABLE 2

| Source IP | Destination IP | Source port number | Destination port number | F1 | F2 | F3 | F4 | F5 |
|---|---|---|---|---|---|---|---|---|
| 1.1.1.1 | 2.2.2.2 | 1111 | 2222 | 1 | 0 | 1 | 1 | 0 |

The respective entries may be expressed as F1, F2, F3, F4, and F5 values for each flow information. In respect to F1 to F5, values of F1 to F5 are present when a predetermined condition is met by the control unit to be described below and if the values are present, it may mean that a specific type of DRDoS warning is generated.

F1 to F5 items of Table 2 may be further added to the flow table shown in Table 1 and the entry of Table 2 is also referred to as the first entry.

The memory unit may have a flow table of a form shown in Table 3 given below and in the present specification, the flow table of the form shown in Table 3 is named as an Acc flow table.

TABLE 3

| Source IP | Destination IP | Source port number | Destination port number | F1 | F2 | F3 | F4 | F5 | Aging |
|---|---|---|---|---|---|---|---|---|---|
| 1.1.1.1 | 2.2.2.2 | 1111 | 2222 | 4 | 0 | 2 | 3 | 0 | 2 |

Table 3 further has an Aging item unlike Table 2 and detailed contents thereof will be described below.

In addition, in the present specification, the entry having F1 to F5 for each flow information and the Aging item is referred to as a second entry.

The control unit as a component that controls an overall operation of the apparatus of detecting a distributed reflection denial of service attack inputs the flow information, and the packet number and size obtained by the monitoring unit in the flow table and detects the DRDoS attack by using the flow table.

Hereinafter, first, a process in which the control unit inputs the flow information, and the packet number and size obtained from the monitoring unit in the flow table will be described with reference to FIG. 2.

Figure 2:
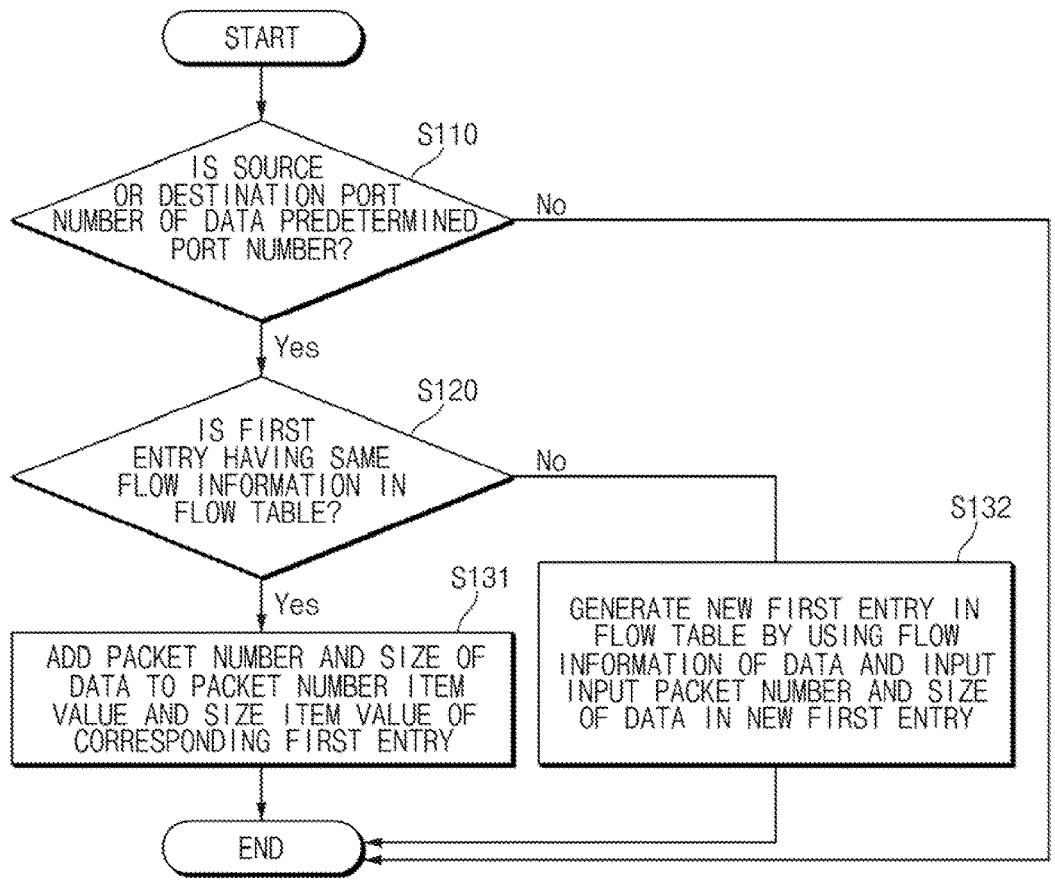
FIG. 2 is a flowchart of a process of inputting flow information of data, and the number and size of packets in a flow table according to an exemplary embodiment of the present invention.

FIG. 2 is a flowchart of a process of inputting flow information of data, and the number and size of packets in a flow table according to an exemplary embodiment of the present invention.

The control unit determines whether a port number of a source or a destination of data is a predetermined port number (S110).

In step S110, it is determined whether the data packet is a related packet of a DNS server and an NTP server. The predetermined port number may be 53 or 123 and the reason is that a UDP port of the DNS server is 53 and the UDP port of the NTP server is 123. However, in addition to 53 or 123, a UDP port number of either server which may be used in the DRDoS attack may also be used.

If the predetermined port number is any one of 53 and 123 and a source port number of the data is 53, the control unit may determine that the corresponding data is a response packet of the DNS server.

Since the present invention is a method for detecting the DRDoS attack using a DNS server response, an NTP server response, and the like, only data associated with the port number of the corresponding server is selected.

When the port number of the source is 53 or 123, the corresponding data may be regarded as a response to a client from the server and when the port number of destination is 53 or 123, the corresponding data may be regarded as a query of the client to the server.

The control unit determines whether the first entry having the same flow information is present in the flow table (S120).

When a new flow table is generated, no information is stored in the flow table, but a first entry having the same flow information, that is, the same source IP, destination port number, destination IP, and destination port number may already be input and present in the flow table among first entry inputs.

When the first entry having the same flow information is present in the flow table, the control unit adds the packet number and size of the data which are input to a packet number item value and a packet size item value of the corresponding first entry which is present in the flow table (S131).

For example, it is assumed that in a predetermined first entry which has already been in the flow table, the source IP is 1.1.1.1, the source port number is 53, the destination IP is 2.2.2.2 and the destination port number is 8080, the packet number item value of the corresponding first entry is 12, and the size item value is 400.

In this case, when the source IP of the data obtained from the monitoring unit is 1.1.1.1, the source port number is 53, the destination IP is 2.2.2.2 and the destination port number is 8080, the packet number is 20, and the packet size is 300, the control unit adds the packet number and size of the obtained data in the already input first entry to input the packet number item value of the corresponding first entry as 32 (=12+20) and the size item value as 700 (=400+300).

When the first entry having the same flow information is not present in the flow table, a new first entry is generated in the flow table by using the flow information of the obtained data and the packet number and size of the data are input in the new first entry (S132).

For example, when the source IP of the data obtained from the monitoring unit is 1.5.5.5, the source port number is 53, the destination IP is 2.5.2.2 and the destination port number is 8080, the packet number is 20, the packet size is 300, and there is no first entry having the same flow information, the control unit generates the new first entry in the flow table.

In addition, 1.5.5.5, 53, 2.5.2.2, 8080, 20, and 300 may be input into the source IP, the source port number, the destination IP, the destination port number, the packet number, and the packet size, respectively.

The control unit may generate the flow table by such a process and newly generates the flow table every predetermined time to generate a plurality of flow tables.

Herein, a process in which the control unit determines the DRDoS attack by using the flow table in which the flow information, and the packet number and size are input will be described with reference to FIGS. 3 to 5.

Figure 3:
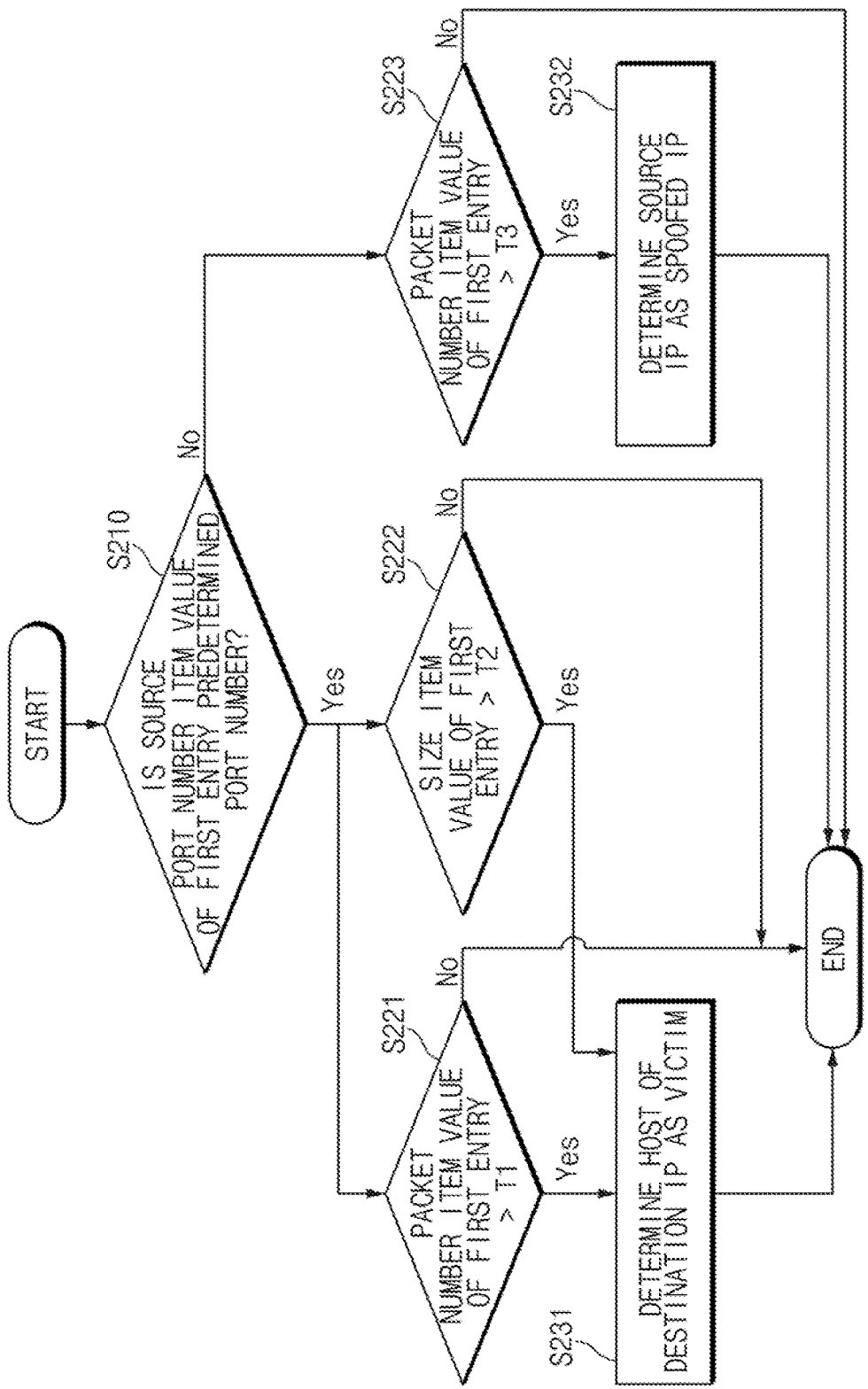
FIG. 3 is a flowchart of a process of determining a DRDoS attack by using packet number and size items of a first entry according to an exemplary embodiment of the present invention.

FIG. 3 is a flowchart of a process of determining a DRDoS attack by using packet number and size items of a first entry according to an exemplary embodiment of the present invention.

Figure 4:
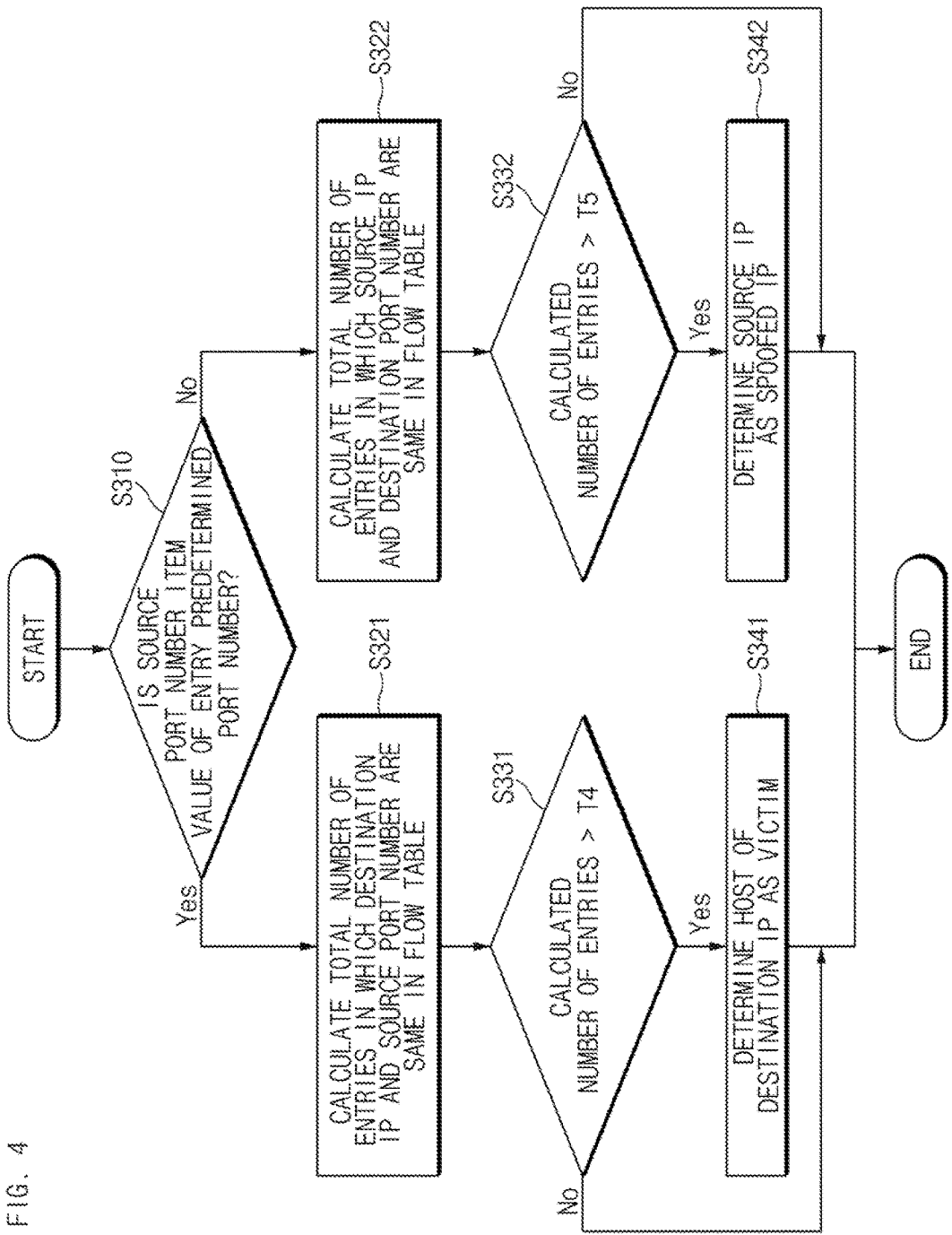
FIG. 4 is a flowchart of a process of determining a DRDoS attack by using the number of first entries according to an exemplary embodiment of the present invention.

Further, FIG. 4 is a flowchart of a process of determining a DRDoS attack by using the number of first entries according to an exemplary embodiment of the present invention.

Referring to FIG. 3, the control unit determines whether the source port number item value of the first entry is a predetermined port number (S210).

In step S210, it is determined whether the source of the data packet is the DNS server and the NTP server.

Herein, the predetermined port number may be 53 or 123 similarly to step S110. However, in addition to 53 or 123, a UDP port number of either server which may be used in the DRDoS attack may also be used.

When the source port number is the predetermined port number (a UDP port number of the server which may be used in the DRDoS attack), the corresponding first entry will be a flow toward the client from the server.

Further, when the predetermined port number is not the source port number, the destination port number will be the predetermined port number. The reason is that when the first entry is input into the flow table, only information of data in which the source port number or the destination port number is the predetermined port number is input. Therefore, when the source port number is not the predetermined port number, the corresponding first entry will be a flow toward the server from the client.

When the source port number item value of the first entry is the predetermined port number, the control unit determines whether the packet number item value of the first entry is larger than a predetermined first value T1 (S221).

Further, when the source port number item value of the first entry is the predetermined port number, the control unit determines whether the packet size item value of the first entry is larger than a predetermined second value T2 (S222).

When the packet number item value of the first entry is larger than the predetermined first value T1 or when the packet size item value of the first entry is larger than the predetermined second value T2, the control unit determines a host of the destination IP of the corresponding first entry as a victim (S231).

In addition, when the packet size item value of the first entry is larger than the predetermined second value T2, it may be determined that the host of the destination IP receives an amplification attack.

When the source port number item value of the first entry is not the predetermined port number, that is, when the destination port number item value of the first entry is the predetermined port number, the control unit determines whether the packet number item value of the first entry is larger than a predetermined third value T3 (S223).

When the packet number item value of the first entry is larger than the predetermined third value T3, the control unit determines the source IP of the corresponding first entry as a spoofed IP (S232).

That is, it is determined that the DRDoS attacker spoofs the source IP of the first entry to the IP address of the zombie host and sends the query packet to the DNS server or the NTP server.

Next, referring to FIG. 4, the control unit determines whether the source port number item value of the first entry is a predetermined port number (S310).

In step S310, it is determined whether the source of the data packet is the DNS server and the NTP server similarly to step S210.

When the source port number item value of the first entry is the predetermined port number, the control unit calculates the total number of first entries in which the destination IP and the source port number are the same as each other in the flow table (S321).

The control unit determines whether the calculated number of first entries is larger than a predetermined fourth value T4 (S331).

When the packet number item value of the first entry is larger than the predetermined fourth value T4, the control unit determines the host of the destination IP of the corresponding first entry as the victim (S341).

The reason is that a normal client will not expect a DNS response or an NTP response from servers of the predetermined number T4 or more.

When the source port number item value of the first entry is not the predetermined port number, that is, when the destination port number item value of the first entry is the predetermined port number, the control unit calculates the total number of first entries in which the source IP and the destination port number are the same as each other in the flow table (S322).

The control unit determines whether the calculated number of first entries is larger than a predetermined fifth value T5 (S332).

When the packet number item value of the first entry is larger than the predetermined fifth value T5, the control unit determines the source IP of the corresponding first entry as the spoofed IP (S342).

The reason is that the normal client sends the query packet to a primary server and a secondary server of the DNS and does not send the query packet more excessively there than.

The control unit may detect the DRDoS attack as described with reference to FIGS. 3 and 4 and this corresponds to a short-term decision algorithm for detecting the DRDoS attack.

Meanwhile, it is preferable to observe a type of an advanced persistent threat (APT) attack over the very long term.

To this end, hereinafter, a process will be described, in which the control unit inputs the second entry in an Acc flow table in order to observe the DRDoS attack over the long term with reference to FIG. 5.

Figure 5:
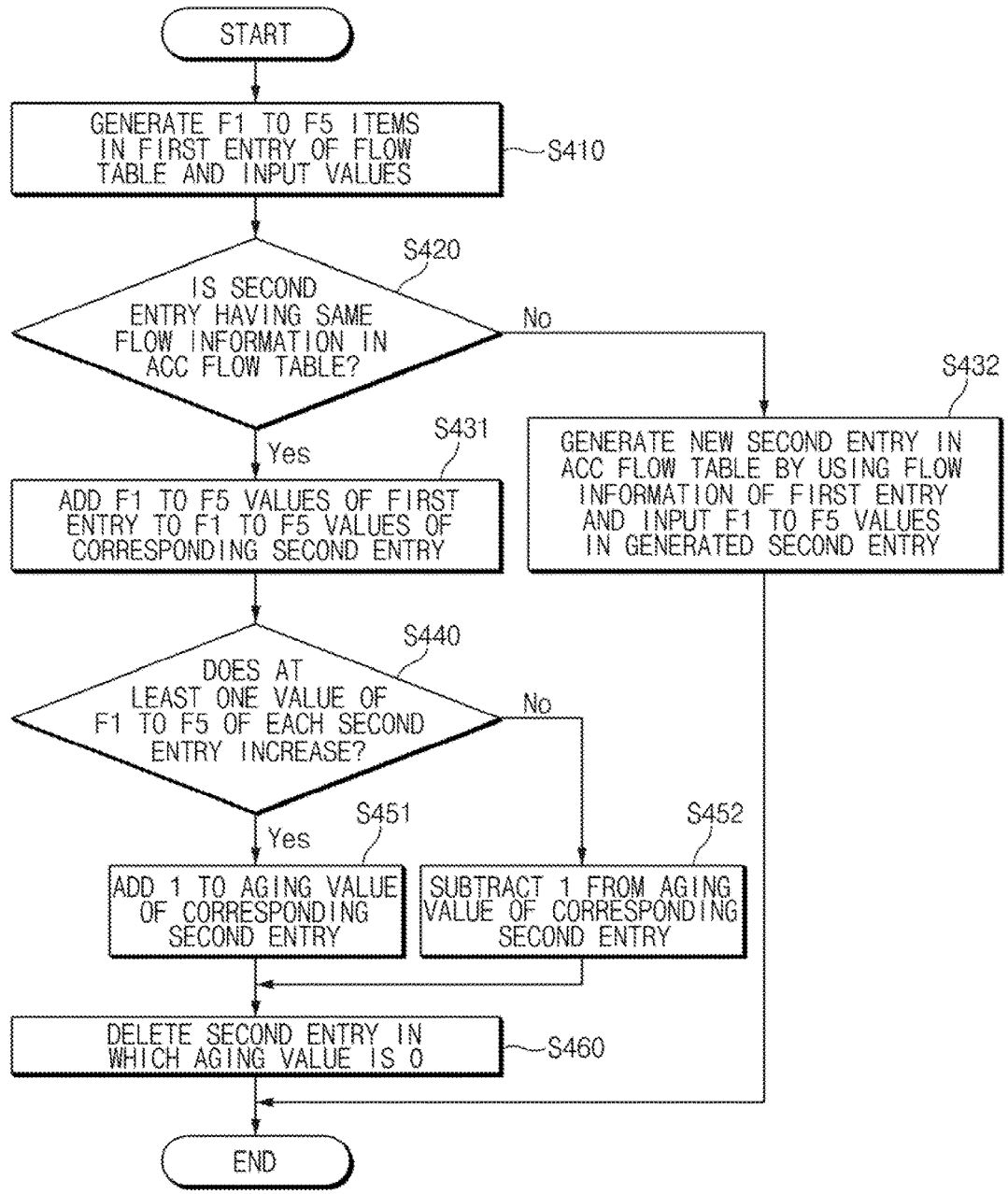
FIG. 5 is a flowchart of a process in which a second entry is input in an Acc flow table according to an exemplary embodiment of the present invention.

FIG. 5 is a flowchart of a process in which a second entry is input in an Acc flow table according to an exemplary embodiment of the present invention.

The control unit generates F1, F2, F3, F4, and F5 items in each first entry of the flow table and inputs F1 to F5 values (S410).

In step S410, the flow table is made as shown in Table 2 described above. When a specific condition is met, 1 is granted to the F1 to F5 values.

When a result of step S210 described with reference to FIG. 3 is Yes and a result of step S221 is Yes, 1 is granted to the F1 value. However, a reference value compared with the packet number item value of the first entry may be a sixth value smaller than the first value T1.

In addition, when the result of step S210 is Yes and the result of step S222 is Yes, 1 is granted to the F2 value. However, the reference value compared with the packet number item value of the first entry may be a seventh value smaller than the second value T2.

When the result of step S210 is No and the result of step S223 is Yes, 1 is granted to the F3 value. However, the reference value compared with the packet number item value of the first entry may be an eighth value smaller than the third value T3.

In addition, when the result of step S310 described with reference to FIG. 4 is Yes and the result of step S331 is Yes, 1 is granted to the F4 value. However, the reference value compared with the packet number item value of the first entry may be a ninth value smaller than the fourth value T4.

When the result of step S310 is No and the result of step S332 is Yes, 1 is granted to the F5 value. However, the reference value compared with the packet number item value of the first entry may be a tenth value smaller than the fifth value T5.

The control unit determines whether the second entry having the same flow information as the first entry is present in the Acc flow table (S420).

When a new Acc flow table is generated, no information is stored in the Acc flow table, but the second entry having the same flow information, that is, the same source IP, destination port number, destination IP, and destination port number may already be input and present in the Acc flow table among second entry inputs.

When the second entry having the same flow information is present in the Acc flow table, the control unit adds the F1 to F5 values of the first entry which are input to the F1 to F5 values of the corresponding second entry which is present in the Acc flow table (S431).

For example, it is assumed that in a predetermined second entry which has already been input in the flow table, the source IP is 1.1.1.1, the source port number is 53, the destination IP is 2.2.2.2 and the destination port number is 8080, F1 of the corresponding second entry is 1, F2 is 0, F3 is 3, F4 is 2, ad F5 is 0.

In this case, when the source IP of the input first entry is 1.1.1.1, the source port number is 53, the destination IP is 2.2.2.2 and the destination port number is 8080, F1 is 1, F2 is 0, F3 is 1, F4 is 0, and F5 is 0, the control unit adds the F1 to F5 values of the first entry to the second entry which has already been input to input F1, F2, F3, F4, and F5 of the corresponding second entry as 2, 0, 3, 2, and 0, respectively.

When the second entry having the same flow information is not present in the Acc flow table, a new second entry is generated in the Acc flow table by using the flow information of the first entry and F1 to F5 of the first entry are input into a new second entry (S432).

When the second entry having the same flow information is present in the Acc flow table and step S431 is performed, the control unit determines whether at least one value of F1 to F5 of each second entry increases (S440).

Since the flow table in which the first entry is input is made based on flow information of data, and the packet number and size obtained for a predetermined time, it is determined whether the F1 to F5 values increase based on the one flow table in step S440.

That is, when a plurality of flow tables is generated every predetermined time, step S440 is performed for each of the flow tables.

The control unit adds 1 to the Aging value of the corresponding second entry when at least one value of F1 to F5 of the second entry increases (S451).

Each second entry may have the Aging item and a value of the Aging item may have a predetermined initial value when the second entry is generated. When at least one value of F1 to F5 of the second entry increases, 1 is added to the Aging value and the Aging value is verified to determine a time when the DRDoS attack occurs.

The control unit subtracts 1 from the Aging value of the corresponding entry when at least one value of F1 to F5 of the second entry is maintained (S452).

The control unit deletes an entry in which the Aging value of the second entry is 0 (S460).

The case where the Aging value becomes 0 means that there is no change in F1 to F5 values for a predetermined time and this means that the DRDoS attack depending on the corresponding flow information does not occur for a predetermined time. Since it is determined that the DRDoS attack does not occur for the predetermined time, the corresponding second entry is deleted.

When at least one of F1 to F5 of the second entry in the Acc flow table is larger than a predetermined 11-th value, the control unit may determine that the DRDoS attack occurs.

Figure 6A:
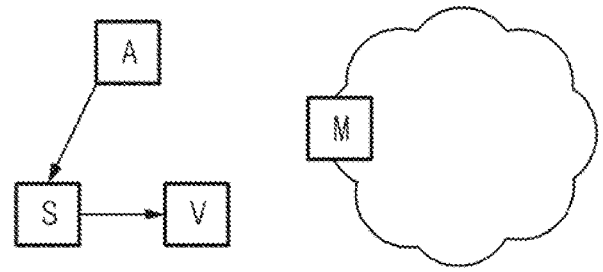
FIG. 6A Illustrates a case in which only the monitoring unit M is present in the stub network according to an exemplary embodiment of the present invention.
Figure 6B:
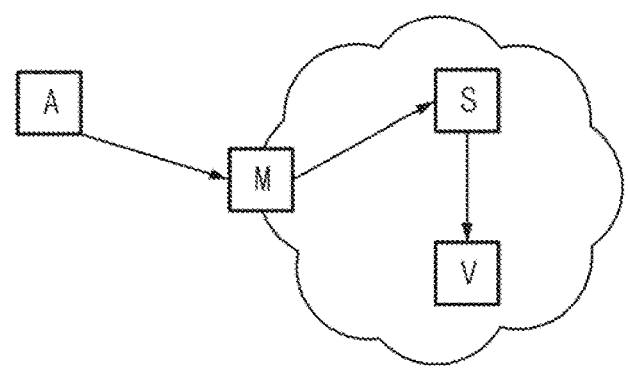
FIG. 6B Illustrates a case in which the server S and the victim V are present in the stub network according to an exemplary embodiment of the present invention.
Figure 6C:
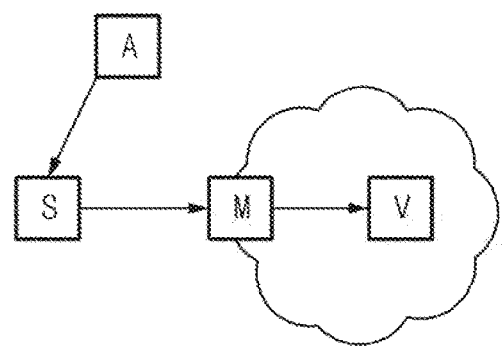
FIG. 6C Illustrates a case in which the victim V is present in the stub network according to an exemplary embodiment of the present invention.
Figure 6D:
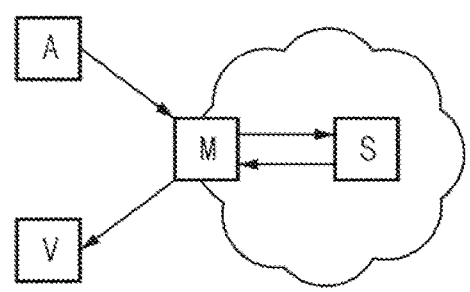
FIG. 6D Illustrates a case in which the server S is present in the stub network according to an exemplary embodiment of the present invention.

Hereinafter, a method of detecting the DRDoS attack for each form of the network will be described with reference to FIG. 6A, FIG. 6B, FIG. 6C and FIG. 6D FIG. 6A Illustrates a case in which only the monitoring unit M is present in the stub network according to an exemplary embodiment of the present invention. FIG. 6B Illustrates a case in which the server S and the victim V are present in the stub network according to an exemplary embodiment of the present invention. FIG. 6C Illustrates a case in which the victim V is present in the stub network according to an exemplary embodiment of the present invention. FIG. 6D Illustrates a case in which the server S is present in the stub network according to an exemplary embodiment of the present invention.

In FIG. 6A, FIG. 6B, FIG. 6C and FIG. 6D, A represents the attacker, S represents the server such as the DNS server, the NTP server, and the like used in the DRDoS attack, M represents the monitoring unit, and V represents the victim.

In FIG. 6A, since only the monitoring unit M is present in the cloud network which is a stub network, the DRDoS may not be detected in the case of FIG. 6A.

FIG. 6B represents a case in which the server S and the victim V are present in the stub network. Therefore, the number $N\_\{req\}$ of DNS query packets of the source IP address spoofed to the monitoring unit positioned at an inlet end of the stub network is much larger than the number $N\_\{res\}$ of response packets. In this case, when the number of query packets is much larger than the number of response packets, it may be determined that the DRDoS attack occurs. In addition, since the source IP address is an internal IP address, the corresponding packet may be detected or discarded by using ingress filtering.

FIG. 6C represents a case in which the victim V is present in the stub network. Therefore, the number $N\_\{res\}$ of DNS response packets toward a target host in the monitoring unit M positioned the inlet end of the stub network will be much larger than the number $N\_\{req\}$ of query packets of the corresponding host.

Accordingly, the relationship is used, the victim V may be detected and when the DNS response packet toward the corresponding host is interrupted, the DRDoS attack may be prevented.

FIG. 6D represents a case in which the server S is present in the stub network. Therefore, in respect to the source IP address IP-spoofed to the monitoring unit M positioned at the inlet end of the stub network, a relationship of the number $N\_\{req\}$ of query packets>>the number $N\_\{res\}$ of response packets is established and in respect to the target host IP address, a relationship of $N\_\{req\}$«$N\_\{res\}$ which is contrary thereto is established.

Therefore, when the relationships are used, both the attacker host and the target host may be detected. The DNS query packet input from the attacker host may be interrupted in order to prevent the DRDoS attack.

Hereinafter, a method of detecting the DRDoS when symmetric routing is applied will be described with reference to FIG. 7.

Figure 7:
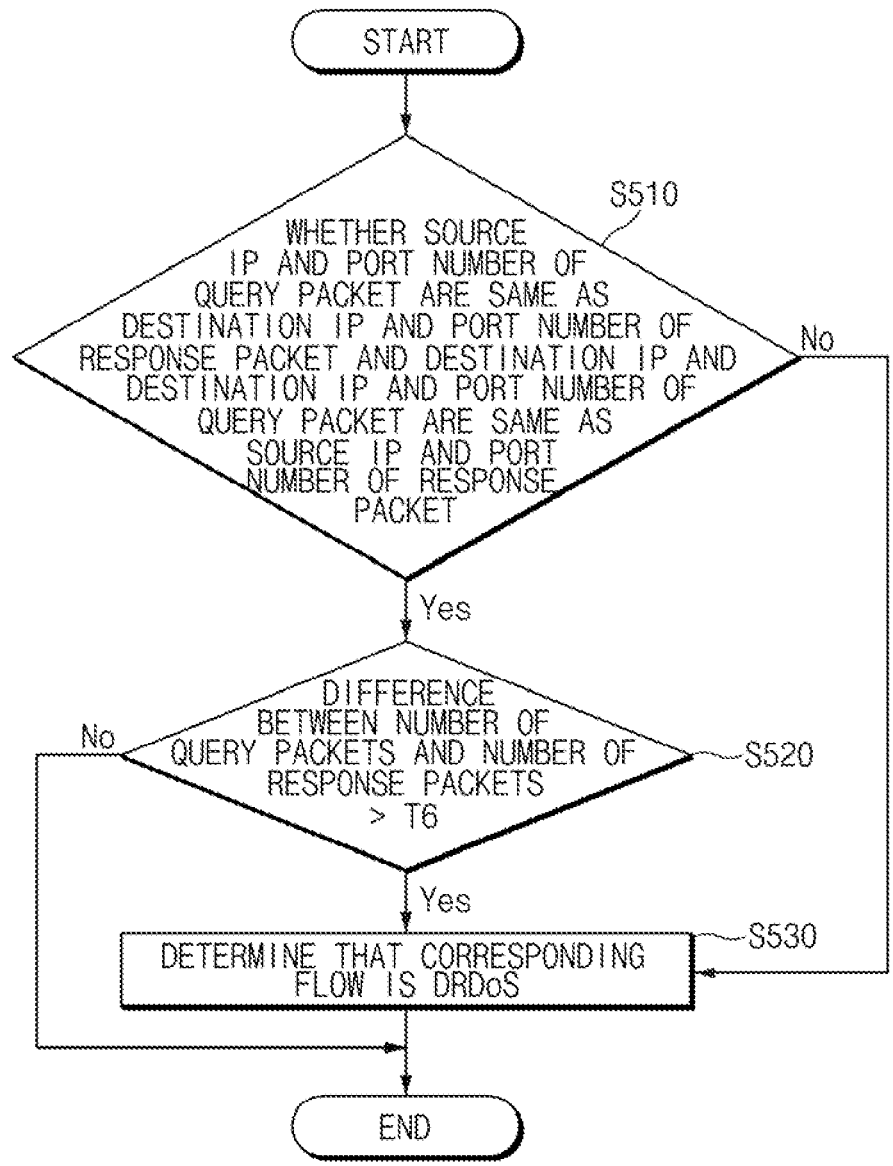
FIG. 7 is a flowchart of a process of detecting a DRDoS attack when symmetric routing is applied according to an exemplary embodiment of the present invention.

FIG. 7 is a flowchart of a process of detecting a DRDoS attack when symmetric routing is applied according to an exemplary embodiment of the present invention.

The control unit determines whether the source IP and the port number of the query packet are the same as the destination IP and the port number of the response packet and whether the destination IP and the port number of the query packet are the same as the source IP and the port number of the response packet. (S510)

When the source IP and the port number of the query packet are the same as the destination IP and the port number of the response packet and the destination IP and the port number of the query packet are the same as the source IP and the port number of the response packet, the control unit determines whether a difference between the number of query packets and the number of response packets is larger than a predetermined 12-th value T6 (S520).

When a result of step S510 is No or a result of step S520 is Yes, the control unit determines that the corresponding flow is the DRDoS (S530).

The reason is that in the case of a normal user, the source IP and the destination IP entries corresponding to the destination port number are present as the destination IP and the source IP of the source port number and the number of packets will be similar.

Figure 8:
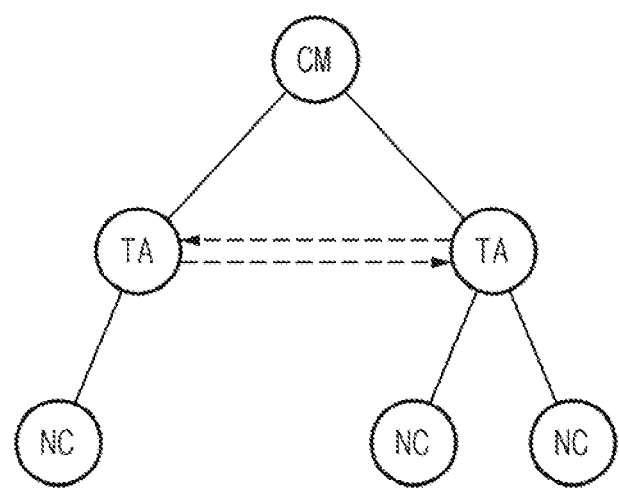
FIG. 8 is a structural diagram of an apparatus of detecting a distributed reflection denial of service attack, which includes a plurality of monitoring units and a plurality of control units according to an exemplary embodiment of the present invention.

FIG. 8 is a structural diagram of an apparatus of detecting a distributed reflection denial of service attack, which includes a plurality of monitoring units and a plurality of control units according to an exemplary embodiment of the present invention.

Referring to FIG. 8, a network-flow collector (NC) corresponds to the monitoring unit and a traceback agent (TA) corresponds to the aforementioned control unit. In addition, a central P2P manager (CM) is a component that manages distributively installed traceback agents (TAs).

A plurality of respective NCs transmits and receives the stored flow table to and from each other and may detect the DRDoS attack by further using the received flow table.

Figure 9:
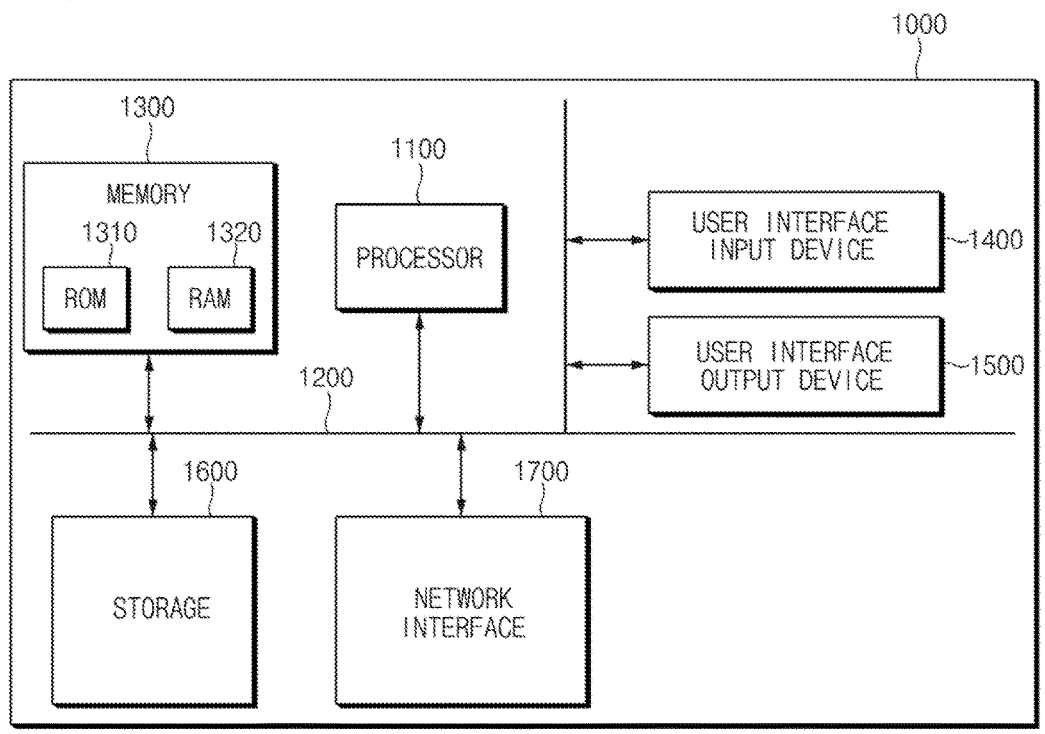
FIG. 9 is a block diagram of a computing system executing a method of detecting a distributed reflection denial of service attack according to an exemplary embodiment of the present invention.

Referring to FIG. 9, the computing system 1000 may include at least one processor 1100, a memory 1300, a user interface input device 1400, a user interface output device 1500, a storage 1600, and a network interface 1700 connected through a bus 1200.

The processor 1100 may be a semiconductor device that executes processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Therefore, steps of a method or an algorithm described in association with the exemplary embodiments disclosed in the specification may be directly implemented by hardware and software modules executed by the processor 1100, or a combination thereof. The software module may reside in storage media (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in the user terminal. As yet another method, the processor and the storage medium may reside in the user terminal as individual components.

In the apparatus and the method of detecting a distributed reflection denial of service attack described as above, the constitutions and methods of the described exemplary embodiments cannot be limitatively applied, but all or some of the respective exemplary embodiments may be selectively combined and configured so that various modifications of the exemplary embodiments can be made.

What is claimed is:

1. An apparatus for detecting a distributed reflection denial of service (DRDoS) attack, the apparatus comprising:
    a monitoring unit obtaining flow information and the number and the sizes of packets of data which flows at one point of a communication network, the flow information including an IP of a source, a port number of the source, an IP of a destination, and a port number of the destination of the data;
    a memory unit storing a flow table in which the flow information of the data, the packet number, and the packet size are input; and
    a control unit:
    inputting the number and the sizes of packets of data obtained by the monitoring unit for a predetermined time as a first entry for the flow information in the flow table when at least one of the port number of the source and the port number of the destination of the data is a predetermined port number,
    detecting the DRDoS attack by using 1) at least one of the number of packets and the size of packet of the first entry, and 2) the flow information of the first entry, and
    determining, using the first entry, a victim of the DRDoS attack, an IP which an attacker of the DRDoS attack spoofs, or both.

2. The apparatus of claim 1, wherein the control unit determines the victim of the DRDoS attack as being a host having a destination IP item value of the first entry when 1) a source port number item value of the first entry is the predetermined port number, and 2) a packet number item value of the first entry is larger than a predetermined first value or a size item value of the first entry is larger than a predetermined second value.

3. The apparatus of claim 1, wherein the control unit determines the IP which the attacker of the DRDoS attack spoofs as being the source IP item value of the first entry when the destination port number item value of the first entry is the predetermined port number and the packet number item value of the first entry is larger than a predetermined third value.

4. The apparatus of claim 1, wherein the control unit determines the victim of the DRDoS attack as being a host having a destination IP item value of the first entry when the source port number item value of the first entry is the predetermined port number, the destination IP item value among the first entries input in the flow table is the same, and the number of first entries in which the source port number item value is the same is larger than a predetermined fourth value.

5. The apparatus of claim 1, wherein the control unit determines the IP which the attacker of the DRDoS attack spoofs as being a destination IP item value of the first entry when the destination port number item value of the first entry is the predetermined port number, the source IP item value among the first entries input in the flow table is the same, and the number of first entries in which the destination port number item value is the same is larger than a predetermined fifth value.

6. The apparatus of claim 1, wherein the control unit newly generates the flow table every predetermined time to input the number and the sizes of packets of the data obtained by the monitoring unit for a predetermined time in the flow table generated as the first entry for each flow information,
    generates F1, F2, F3, F4, and F5 items in the first entry,
    grants 1 to the F1 value of the first entry when the source port number item value of the first entry is the predetermined port number and the packet number item value of the first entry is larger than a predetermined sixth value,
    grants 1 to the F2 value of the first entry when the source port number item value of the first entry is the predetermined port number and the packet size item value of the first entry is larger than a predetermined seventh value,
    grants 1 to the F3 value of the first entry when the destination port number item value of the first entry is the predetermined port number and the packet number item value of the first entry is larger than a predetermined eighth value,
    calculates the number of first entries in which the destination IP item value is the same and the source port number item value is the same among the first entries input into the flow table and grants 1 to the F4 value of the first entry in which the destination IP item value is the same and the source port number item value is the same when the calculated number of first entries is larger than a predetermined 9-th value,
    calculates the number of first entries in which the source IP item value is the same and the destination port number item value is the same among the first entries input into the flow table and grants 1 to the F5 value of the first entry in which the source IP item value is the same and the destination port number item value is the same when the calculated number of first entries is larger than a predetermined 10-th value,
    generates an Acc flow table in the storage unit,
    inputs F1 to F5 of the first entry of the flow table in the Acc flow table as the second entry for each flow information and aggregates and inputs the F1 to F5 values of the second entry having the same flow information, and
    determines that the DRDoS attack occurs when at least one of F1 to F5 of the second entry in the Acc flow table is larger than a predetermined 11-th value whenever all of the first entries of the respective generated flow tables every predetermined time are to be input.

7. The apparatus of claim 6, wherein the control unit
    generates an Aging item in the second entry,
    whenever all of the first entries of the respective flow tables generated every predetermined time are input,
    increases the Aging value of the second entry in which at least one value of F1 to F5 values increases among the second entries by 1,
    decreases the Aging value of the second entry in which the F1 to F5 values are maintained among the second entries by 1, and
    deletes the second entry in which the Aging value is 0 from the Acc flow table.

8. The apparatus of claim 1, wherein the flow information includes information indicating whether the data is a query packet and whether the data is a response packet, and the control unit determines that the DRDoS attack occurs when the source IP and the port number of the query packet are the same as the destination IP and the port number of the response packet and the destination IP and the port number of the query packet are the same as the source IP and the port number of the response packet, and a difference between the number of query packets and the number of response packets is larger than a predetermined 12-th value for the predetermined time.

9. The apparatus of claim 1, wherein the flow information includes information indicating whether the data is a query packet and whether the data is a response packet, and
the control unit determines that the DRDoS attack occurs when the source IP and the port number of the query packet are not the same as the destination IP and the port number of the response packet or the destination IP and the port number of the query packet are not the same as the source IP and the port number of the response packet.

10. The apparatus of claim 1, wherein the monitoring unit and the control unit are provided in plural, and
the plurality of respective control units transmits and receives the stored flow table to and from each other and detects the DRDoS attack by further using the received flow table.

11. A method of detecting a distributed reflection denial of service (DRDoS) attack, the method comprising:
obtaining flow information and the number and the sizes of packets of data which flows at one point of a communication network, the flow information including an IP of a source, a port number of the source, an IP of a destination, and a port number of the destination of the data;
inputting the number and the sizes of packets of data obtained for a predetermined time as a first entry for the flow information in the flow table when at least one of the port number of the source and the port number of the destination of the data is a predetermined port number;
detecting the DRDoS attack by using 1) at least one of the number of packets and the size of packet of the first entry, and 2) the flow information of the first entry, and determining, using the first entry, a victim of the DRDoS attack, an IP which an attacker of the DRDoS attack spoofs, or both.

12. The method of claim 11, wherein detecting the DRDoS attack comprises determining the victim of the DRDoS attack as being a host having a destination IP item value of the first entry when a source port number item value of the first entry is the predetermined port number, a packet number item value of the first entry is larger than a predetermined first value or a size item value of the first entry is larger than a predetermined second value.

13. The method of claim 11, wherein detecting the DRDoS attack comprises determining the IP which the attacker of the DRDoS attacks spoofs as being the source IP item value of the first entry when the destination port number item value of the first entry is the predetermined port number and the packet number item value of the first entry is larger than a predetermined third value.

14. The method of claim 11, wherein detecting the DRDoS attack comprises determining the victim of the DRDoS attack as being a host having the destination IP item value when the source port number item value of the first entry is the predetermined port number, the destination IP item value among the first entries input in the flow table is the same, and the number of first entries in which the source port number item value is the same is larger than a predetermined fourth value.

15. The method of claim 11, wherein detecting the DRDoS attack comprises determining the IP which the attacker of the DRDoS attacks spoofs as being the destination IP item value when the destination port number item value of the first entry is the predetermined port number, the source IP item value among the first entries input in the flow table is the same, and the number of first entries in which the destination port number item value is the same is larger than a predetermined fifth value.

16. A method of detecting a distributed reflection denial of service (DRDoS) attack, the method comprising:
obtaining flow information including an IP of a source, a port number of the source, an IP of a destination, and a port number of the destination of data which flows at one point of a communication network, and the number and the sizes of packets;
inputting the number and the sizes of packets of data obtained for a predetermined time as a first entry for each flow information in the flow table when at least one of the port number of the source and the port number of the destination of the data is a predetermined port number;
detecting the DRDoS attack by using 1) at least one of the number of packets and the size of packet of the first entry, and 2) the flow information of the first entry;
newly generating the flow table every predetermined time to input the number and the sizes of packets of the data obtained by the monitoring unit for a predetermined time in the flow table generated as the first entry for each flow information;
generating F1, F2, F3, F4, and F5 items in the first entry and granting 1 to the F1 value of the first entry when the source port number item value of the first entry is the predetermined port number and the packet number item value of the first entry is larger than a predetermined 6-th value, granting 1 to the F2 value of the first entry when the source port number item value of the first entry is the predetermined port number and the packet size item value of the first entry is larger than a predetermined 7-th value, granting 1 to the F3 value of the first entry when the destination port number item value of the first entry is the predetermined port number and the packet number item value of the first entry is larger than a predetermined 8-th value, calculating the number of first entries in which the destination IP item value is the same and the source port number item value is the same among the first entries input in the flow table, granting 1 to the F4 value of the first entry in which the destination IP item value is the same and the source port number item value is the same when the calculated number of first entries is larger than a predetermined 9-th value, and calculating the number of first entries in which the source IP item value is the same and the destination port number item value is the same among the first entries input in the flow table and granting 1 to the F5 value of the first entry in which the source IP item value is the same and the destination port number item value is the same when the calculated number of first entries is larger than a predetermined 10-th value;
generating an Acc flow table;
inputting F1 to F5 of the first entry of the flow table in the Acc flow table as the second entry for each flow information and aggregating and inputting the F1 to F5 values of the second entry having the same flow information; and determining that the DRDoS attack occurs when at least one of F1 to F5 of the second entry in the Acc flow table is larger than a predetermined 11-th value whenever all of the first entries of the respective generated flow tables are input every predetermined time.

17. The method of claim 16, wherein the generating of the Aging item in the second entry further includes increasing the Aging value of the second entry in which at least one value of the F1 to F5 values increases among the second entries by 1 and decreasing the Aging value of the second entry in which the F1 to F5 values are maintained among the second entries by 1 whenever all of the first entries of the respective generated flow tables every predetermined time are input, and deleting the second entry in which the Aging value is 0 from the Acc flow table.

18. The method of claim 11, wherein the flow information includes information indicating whether the data is a query packet and whether the data is a response packet, and in the detecting of the DRDoS attack, it is determined that the DRDoS attack occurs when the source IP and the port number of the query packet are the same as the destination IP and the port number of the response packet and the destination IP and the port number of the query packet are the same as the source IP and the port number of the response packet, and a difference between the number of query packets and the number of response packets is larger than a predetermined 12-th value for the predetermined time.

19. The method of claim 11, wherein the flow information includes information indicating whether the data is a query packet and whether the data is a response packet, and in the detecting of the DRDoS attack, it is determined that the DRDoS attack occurs when the source IP and the port number of the query packet are not the same as the destination IP and the port number of the response packet or the destination IP and the port number of the query packet are not the same as the source IP and the port number of the response packet.

\* \* \* \* \*